(12) United States Patent
Seem

(10) Patent No.: US 8,567,204 B2
(45) Date of Patent: Oct. 29, 2013

(54) SENSOR-FREE OPTIMAL CONTROL OF AIR-SIDE ECONOMIZER

(75) Inventor: John E. Seem, Glendale, WI (US)

(73) Assignee: Johnson Controls Technology Company, Holland, MI (US)

(*) Notice: Subject to any disclaimer, the term of this patent is extended or adjusted under 35 U.S.C. 154(b) by 266 days.

(21) Appl. No.: 12/938,203

(22) Filed: Nov. 2, 2010

(65) Prior Publication Data

US 2011/0056224 A1    Mar. 10, 2011

Related U.S. Application Data

(63) Continuation of application No. 11/699,859, filed on Jan. 30, 2007, now abandoned.

(51) Int. Cl.
*F25D 17/04* (2006.01)
*F25B 49/00* (2006.01)
*G05B 13/02* (2006.01)
*G05B 21/00* (2006.01)

(52) U.S. Cl.
USPC ............... 62/186; 62/132; 700/28; 700/32; 700/276

(58) Field of Classification Search
USPC ...... 236/49.3, 13, 1 C, 1 E; 62/186, 127, 132; 700/32, 28, 30, 40, 276
See application file for complete search history.

(56) References Cited

U.S. PATENT DOCUMENTS

| | | | |
|---|---|---|---|
| 2,812,141 A | 11/1957 | Sueda et al. | |
| 3,181,791 A | 5/1965 | Axelrod | |
| 4,026,251 A | 5/1977 | Schweitzer et al. | |
| 4,114,807 A | 9/1978 | Naseck et al. | |
| 4,182,180 A | 1/1980 | Mott | |
| 4,199,101 A * | 4/1980 | Bramow et al. | 236/13 |
| 4,257,238 A | 3/1981 | Kountz et al. | |
| 4,319,461 A | 3/1982 | Shaw | |
| 4,367,631 A | 1/1983 | Johnson et al. | |
| 4,512,161 A | 4/1985 | Logan et al. | |
| 4,558,595 A | 12/1985 | Kompelien | |
| 4,607,789 A | 8/1986 | Bowman | |
| 4,872,104 A | 10/1989 | Holsinger | |
| 4,876,858 A | 10/1989 | Shaw et al. | |
| 4,942,740 A | 7/1990 | Shaw et al. | |
| 5,251,814 A | 10/1993 | Warashina et al. | |
| 5,346,129 A | 9/1994 | Shah et al. | |

(Continued)

FOREIGN PATENT DOCUMENTS

JP    63-231127 A    9/1988
JP    04-062352 A    2/1992

(Continued)

OTHER PUBLICATIONS

Office Action for U.S. Appl. No. 13/484,121, mail date Oct. 12, 2012, 7 pages.

(Continued)

*Primary Examiner* — Chen Wen Jiang

(74) *Attorney, Agent, or Firm* — Foley & Lardner LLP

(57) ABSTRACT

Systems and methods for regulating the amount of outdoor air that is introduced into a building are shown and described. These systems and methods utilize extremum seeking control logic to vary the flow of outdoor air into the building in response to cooling load determinations.

10 Claims, 9 Drawing Sheets

(56) References Cited

U.S. PATENT DOCUMENTS

| | | | |
|---|---|---|---|
| 5,351,855 A | 10/1994 | Nelson et al. | |
| 5,355,305 A * | 10/1994 | Seem et al. | 700/41 |
| 5,414,640 A | 5/1995 | Seem | |
| 5,461,877 A | 10/1995 | Shaw et al. | |
| 5,467,287 A | 11/1995 | Wenner et al. | |
| 5,506,768 A | 4/1996 | Seem et al. | |
| 5,555,195 A | 9/1996 | Jensen et al. | |
| 5,568,377 A | 10/1996 | Seem et al. | |
| 5,590,830 A | 1/1997 | Kettler et al. | |
| 5,623,402 A | 4/1997 | Johnson | |
| 5,675,979 A | 10/1997 | Shah | |
| 5,682,329 A | 10/1997 | Seem et al. | |
| 5,746,061 A | 5/1998 | Kramer | |
| 5,769,315 A | 6/1998 | Drees | |
| 5,791,408 A | 8/1998 | Seem | |
| 5,867,384 A | 2/1999 | Drees et al. | |
| 6,006,142 A | 12/1999 | Seem et al. | |
| 6,098,010 A | 8/2000 | Krener et al. | |
| 6,115,713 A | 9/2000 | Pascucci et al. | |
| 6,118,186 A | 9/2000 | Scott et al. | |
| 6,122,605 A | 9/2000 | Drees et al. | |
| 6,161,764 A | 12/2000 | Jatnieks | |
| 6,219,590 B1 | 4/2001 | Bernaden, III et al. | |
| 6,223,544 B1 * | 5/2001 | Seem | 62/127 |
| 6,265,843 B1 | 7/2001 | West et al. | |
| 6,269,650 B1 | 8/2001 | Shaw | |
| 6,296,193 B1 | 10/2001 | West et al. | |
| 6,326,758 B1 | 12/2001 | Discenzo | |
| 6,369,716 B1 | 4/2002 | Abbas et al. | |
| 6,389,331 B1 | 5/2002 | Jensen et al. | |
| 6,408,228 B1 | 6/2002 | Seem et al. | |
| 6,415,617 B1 | 7/2002 | Seem | |
| 6,477,439 B1 | 11/2002 | Bernaden, III et al. | |
| 6,594,554 B1 | 7/2003 | Seem et al. | |
| 6,816,811 B2 | 11/2004 | Seem | |
| 6,862,540 B1 | 3/2005 | Welch et al. | |
| 6,937,909 B2 | 8/2005 | Seem | |
| 6,973,793 B2 | 12/2005 | Douglas et al. | |
| 7,031,880 B1 | 4/2006 | Seem et al. | |
| 7,050,873 B1 | 5/2006 | Discenzo | |
| 7,113,890 B2 | 9/2006 | Frerichs et al. | |
| 7,124,637 B2 | 10/2006 | Singhal et al. | |
| 7,169,039 B2 | 1/2007 | Oppedisano et al. | |
| 7,434,413 B2 | 10/2008 | Wruck | |
| 7,578,734 B2 | 8/2009 | Ahmed et al. | |
| 7,685,830 B2 | 3/2010 | Thybo et al. | |
| 7,827,813 B2 | 11/2010 | Seem | |
| 8,027,742 B2 * | 9/2011 | Seem et al. | 700/38 |
| 8,200,344 B2 * | 6/2012 | Li et al. | 700/38 |
| 8,200,345 B2 * | 6/2012 | Li et al. | 700/38 |
| 2003/0109963 A1 | 6/2003 | Oppedisano et al. | |
| 2004/0164690 A1 | 8/2004 | Degner et al. | |
| 2005/0006488 A1 | 1/2005 | Stanimirovic | |
| 2005/0040250 A1 | 2/2005 | Wruck | |
| 2006/0016201 A1 | 1/2006 | Kopel | |
| 2006/0090467 A1 | 5/2006 | Crow | |
| 2006/0259285 A1 | 11/2006 | Bahel et al. | |
| 2007/0023533 A1 | 2/2007 | Liu | |
| 2007/0191967 A1 | 8/2007 | Yo et al. | |
| 2008/0097651 A1 | 4/2008 | Shah et al. | |
| 2008/0179408 A1 | 7/2008 | Seem | |
| 2008/0179409 A1 | 7/2008 | Seem | |
| 2008/0277486 A1 | 11/2008 | Seem et al. | |
| 2009/0001179 A1 | 1/2009 | Dempsey | |
| 2009/0083583 A1 | 3/2009 | Seem et al. | |
| 2009/0099698 A1 | 4/2009 | Masui et al. | |
| 2009/0308941 A1 | 12/2009 | Patch | |
| 2010/0082161 A1 | 4/2010 | Patch | |
| 2010/0106328 A1 | 4/2010 | Li et al. | |
| 2010/0106331 A1 | 4/2010 | Li et al. | |
| 2012/0239166 A1 * | 9/2012 | Li et al. | 700/38 |

FOREIGN PATENT DOCUMENTS

| | | |
|---|---|---|
| JP | 10-047738 A | 2/1998 |
| SU | 535103 A | 11/1976 |
| WO | WO 00/68744 A1 | 11/2000 |
| WO | WO 2009/012269 A2 | 1/2009 |
| WO | WO 2009/012282 A2 | 1/2009 |

OTHER PUBLICATIONS 90.1 User's Manual, Energy Standard for Buildings Except Low-Rise Residential Buildings, ANSI/ASHRAE/IESNA Standard 90.1-2004, 7 pages.

Adetola et al., Adaptive Extremum-Seeking Receding Horizon Control of Nonlinear Systems, American Control Conference Proceedings, 2004, pp. 2937-2942.

Adetola et al., Adaptive Output Feedback Extremum Seeking Receding Horizon Control of Linear Systems, ScienceDirect, Elsevier, Journal of Process Control, vol. 16, 2006, pp. 521-533.

Adetola et al., Parameter Convergence in Adaptive Extremum-Seeking Control, ScienceDirect, Elsevier, Automatica, vol. 43, available online Sep. 28, 2006, pp. 105-110.

Ariyur et al., Analysis and Design of Multivariable Extremum Seeking, Proceedings of the American Control Conference, May 8-10, 2002, Anchorage, Alaska, pp. 2903-2908.

Ariyur et al., Multivariable Extremum Seeking Feedback: Analysis and Design, 2002, pp. 1-15.

Ariyur et al., Real Time Optimization by Extremum Seeking Control, John Wiley & Sons, Oct. 2003.

Ariyur et al., Slope Seeking and Application to Compressor Instability Control, Proceedings of the 41st IEEE Conference on Decision and Control, Dec. 2002, Las Vegas, Nevada, pp. 3690-3697.

Ariyur et al., Slope Seeking: A Generalization of Extremum Seeking, International Journal of Adaptive Control and Signal Processing, vol. 18, 2004, pp. 1-22.

Astrom et al., Optimalizing Control, Adaptive Control Second Edition Addison-Wesley Publishing Company, 1995, pp. 214-230.

Banaszuk et al., Adaptive Control of Combustion Instability Using Extremum-Seeking, Proceedings of the American Control Conference, Jun. 2000, Chicago, Illinois, pp. 416-422.

Banavar et al., Functional Feedback in an Extremum Seeking Loop, Proceedings of the 40th IEEE Conference on Decision and Control, Dec. 2001, Orlando, Florida, pp. 1316-1321.

Banavar, R.N., Extremum Seeking Loops with Quadratic Functions: Estimation and Control, International Journal of Control, vol. 76, No. 14, 2003, pp. 1475-1482.

Beaudoin et al., Bluff-Body Drag Reduction by Extremum-Seeking Control, Journal of Fluids and Structures, vol. 22, 2006, pp. 973-978.

Binetti et al., Control of Formation Flight via Extremum Seeking, Proceedings of the American Control Conference, May 8-10, 2002, Anchorage, Alaska, pp. 2848-2853.

Blackman, P.F., Extremum-Seeking Regulators, An Exposition of Adaptive Control, Pergamon Press, 1962.

Cowan, Review of Recent Commercial Roof Top Unit Field Studies in the Pacific Northwest and California, report for Northwest Power and Conservation Council and Regional Technical Forum, Oct. 8, 2004, 18 pages.

Doe Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, vol. 3, No. 1, Mar. 1995, pp. 79-85.

Financial Times Energy, Inc. Economizers, Energy Design Resources, taken from http://www.energydesignresources.com/resource/28/, believed to be available by at least Jan. 2007, 30 pages.

Guay et al., Adaptive Extremum Seeking Control of Nonlinear Dynamic Systems with Parametric Uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.

(56) References Cited

OTHER PUBLICATIONS

International Search Report and Written Opinion for International Patent Application No. PCT/US2008/070118, mailed Oct. 19, 2009, 11 pages.
Killingsworth et al., PID Turning Using Extremum Seeking, IEEE Control Systems Magazine, Feb. 2006, pp. 70-79.
Krstic et al., Stability of Extremum Seeking Feedback for General Nonlinear Dynamic Systems, Automatica, vol. 36, Mar. 1997, pp. 595-601.
Krstic, Miroslav, Extremum Seeking Control for Discrete-Time Systems; IEEE Transactions on Automatic Control, University of California Postprints, 2002, pp. 318-323.
Krstic, Miroslav, Performance Improvement and Limitations in Extremum Seeking Control Department of Mechanical and Aerospace Engineering, University of California, San Diego, La Jolla, California, Dec. 1998, pp. 313-326.
Larsson, Stefan, Literature Study on Extremum Control, Control and Automation Laboratory, Department of Signals and Systems, Chalmers University of Technology, Nov. 2001, pp. 1-14.
Leblanc, M. Sur l'electrification des Chemins de fer au Moyen de Courants Alternatifs de Frequence Elevee, Revue Generale de l'Electricite, 1922.
Leyva et al., MPPT of Photovoltaic Systems Using Extremum-Seeking Control, IEEE Transactions on Aerospace and Electronic Systems, vol. 42, No. 1, Jan. 2006, pp. 249-258.
Li et al., Extremum Seeking Control of a Tunable Thermoacoustic Cooler, IEEE Transactions on Control Systems Technology, vol. 13, No. 4, Jul. 2005, pp. 527-536.
Liu et al., Extremum-Seeking with Variable Gain Control for Intensifying Biogas Production in Anaerobic Fermentation, Water Science & Technology, vol. 53, No. 4-5, 2006, pp. 35-44.
Marcos et al., Adaptive Extremum-Seeking Control of a Continuous Stirred Tank Bioreactor with Haldane's Kinetics, Journal of Process Control, vol. 14, 2004, pp. 317-328.
Notice of Allowance for U.S. Appl. No. 11/699,860, dated Aug. 23, 2010, 6 pages.
Office Action for U.S. Appl. No. 11/699,860, dated Aug. 20, 2009, 18 pages.
Office Action for U.S. Appl. No. 11/699,859, dated Mar. 15, 2010, 12 pages.
Office Action for U.S. Appl. No. 11/699,860 dated Jun. 9, 2010, 9 pages.
Office Action for U.S. Appl. No. 11/699,859, dated Aug. 31, 2010, 6 pages.
Pan et al., Discrete-Time Extremum Seeking Algorithms, Proceedings of American Control Conference, Anchorage, Alaska, May 2002, pp. 3753-3758.
Popovic et al., Extremum Seeking Methods for Optimzation of Variable Cam Timing Engine Operation, Proceedings of the American Control Conference, Jun. 4-6, 2003, Denver, Colorado, pp. 3136-3141.
Rotea, Analysis of Multivariable Extremum Seeking Algorithms, Proceedings of the American Control Conference, Jun. 2000, Chicago, Illinois, pp. 433-437.
Salsbury, A Controller for HVAC Systems with Embedded Fault Detection Capabilities Based on Simulation Models, presented at the International Building Simulation Conference in Kyoto, Japan, Sep. 1999, 8 pages.
Sane et al., Building HVAC Control Systems—Role of Controls and Optimization, Proceedings of the American Control Conference, Jun. 14-16, 2006, Minneapolis, Minnesota, 6 pages.
Speyer et al., Extremum Seeking Loops with Assumed Functions, Proceedings of the 39th IEEE Conference on Decision and Control, Dec. 2000, Sydney, Australia, pp. 142-147.
Sternby, Extremum Control Systems—An Area for Adaptive Control?, Joint Automatic Control Conference, San Francisco, California, Aug. 13-15, 1980, 12 pages.
Teel et al., Solving Smooth and Nonsmooth Multivariable Extremum Seeking Problems by the Methods of Nonlinear Programming, Proceedings of American Control Conference, Jun. 2001, Arlington, Virginia, pp. 2394-2399.
Teel, A.R., Lyapunov Methods in Nonsmooth Optimization, Part I: Quasi-Newton Algorithms for Lipschitz, Regular Functions, Proceedings of the 39th IEEE Conference on Decision and Control, Dec. 2000, Sydney, Australia, pp. 112-117.
Teel, A.R., Lyapunov Methods in Nonsmooth Optimization, Part II: Persistently Exciting Finite Differences, Proceedings of the 39th IEEE Conference on Decision and Control, Dec. 2000, Sydney, Australia, pp. 118-123.
Titica et al., Adaptive Extremum Seeking Control of Fed-Batch Bioreactors, European Journal of Control, 2003, pp. 618-631.
Tsien, H.S., Engineering Cybernetics, McGraw-Hill Book Company, Inc., 1954.
Tunay, I., Antiskid Control for Aircraft via Etremum-Seeking, Proceedings of American Control Conference, Jun. 2001, Arlington, Virginia, pp. 665-670.
Walsh, On the Application of Multi-Parameter Extremum Seeking Control, Proceedings of the American Control Conference, Jun. 2000, Chicago, Illinois, pp. 411-415.
Wang et al., Experimental Application of Extremum Seeking on an Axial-Flow Compressor, IEEE Transactions on Control Systems Technology, vol. 8, No. 2, Mar. 2000, pp. 300-309.
Wang et al., Extremum Seeking for Limit Cycle Minimization, IEEE Transactions on Automatic Control, vol. 45, No. 12, Dec. 2000, pp. 2432-2437.
Wang et al., Optimizing Bioreactors by Extremum Seeking, International Journal of Adaptive Control and Signal Processing, 1999, pp. 651-669.
Yu et al., Extremum-Seeking Control Strategy for ABS System with Time Delay, Proceedings of American Control Conference, May 2002, Anchorage, Alaska, pp. 3753-3758.
Yu et al., Extremum-Seeking Control via Sliding Mode with Periodic Search Signals, Proceedings of the 41st IEEE Conference on Decision and Control, Dec. 2002, Las Vegas, Nevada, pp. 323-328.
Zhang et al., Extremum-Seeking Nonlinear Controllers for a Human Exercise Machine, IEEE/ASME Transactions on Mechatronics, vol. 11, No. 2, Apr. 2006, pp. 233-240.
Zhang, Y., Stability and Performance Tradeoff with Discrete Time Triangular Search Minimum Seeking, Proceedings of American Control Conference, Jun. 2000, Chicago, Illinois, pp. 423-427.
Office Action for U.S. Appl. No. 13/226,405, mail date Jun. 20, 2012, 9 pages.
Office Action for U.S. Appl. No. 13/484,131, mail date Aug. 6, 2012, 16 pages.
Examination Report for G.B. Patent Application No. 1000634.4, mailed Aug. 30, 2011, 2 pages.
Office Action for U.S. Appl. No. 12/683,883, dated Sep. 19, 2011, 7 pages.
Office Action for U.S. Appl. No. 12/323,293, dated Feb. 3, 2011, 9 pages.
Office Action for U.S. Appl. No. 12/650,366, dated Oct. 20, 2011, 18 pages.
Office Action for U.S. Appl. No. 13/325,971, mail date Dec. 18, 2012, 12 pages.

* cited by examiner

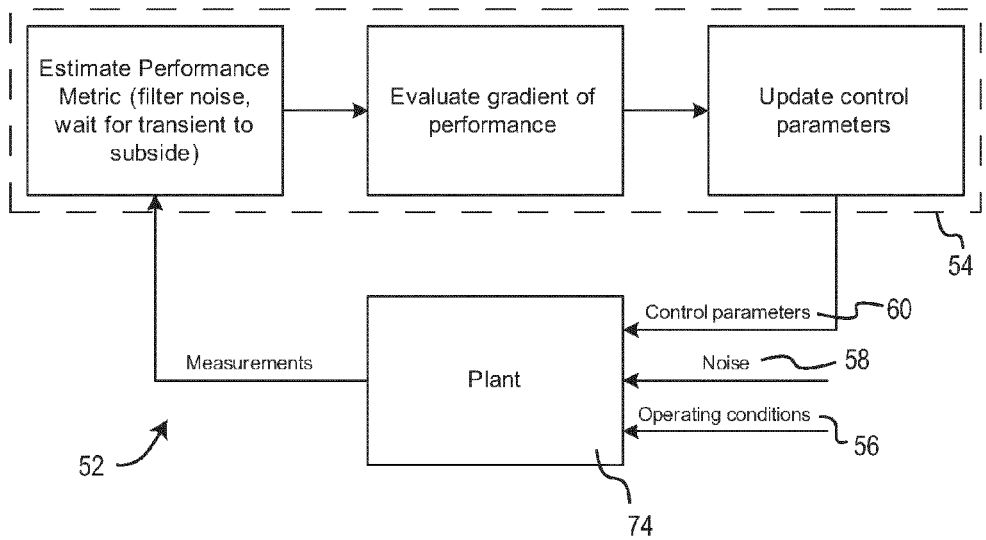

FIGURE 5

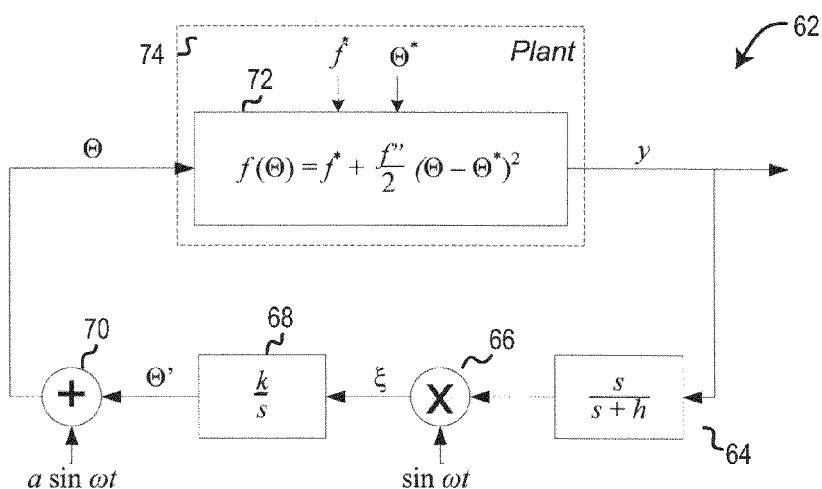

$y$ = output to be minimized
$f^*$ = minimum of the map
$f''$ = second derivative (positive - $f(\Theta)$ has a min.)
$\Theta^*$ = unknown parameter
$\Theta'$ = estimate of $\Theta^*$ $k$ = adaptation gain (positive) of the interger $\frac{1}{s}$
$a$ = amplitude of the probing signal
$\omega$ = frequency of the probing signal
$h$ = cut-off frequency of the "washout filter" $\frac{s}{s+h}$
+/x = modulation/demodulation

FIGURE 6

SENSOR-FREE OPTIMAL CONTROL OF AIR-SIDE ECONOMIZER

CROSS-REFERENCE TO RELATED PATENT APPLICATIONS

This is a continuation of U.S. application Ser. No. 11/699,859, filed Jan. 30, 2007, which is incorporated herein by reference in its entirety.

BACKGROUND

The present application relates to the control of air-handling units of a heating, ventilation and air conditioning system, and more particularly to regulating the amount of outdoor air that is introduced into the system in order to reduce the amount of mechanical heating and cooling required.

FIG. 2 conceptually illustrates a single duct air-handling unit (AHU) 10 of a heating, ventilation and air conditioning (HVAC) system which controls the environment of a room 12 in a building 5. Air from room 12 is drawn into a return duct 14 from which some of the air flows through a return damper 16 to a supply duct 18. Some of the return air may be exhausted outside the building through an outlet damper 20 and replenished by fresh outdoor air entering through an inlet damper 22. A minimum amount of fresh outdoor air entering the system for proper ventilation within the building is typically required by building codes. The dampers 16, 20, and 22 are opened and closed by actuators which are operated by a controller 24 to control the ratio of return air to fresh outdoor air. The mixture of return air and fresh outdoor air is forced by a fan 25 through a cooling coil 26 and a heating coil 28 before being fed into room 12.

Controller 24 also operates a pair of valves 27 and 29 that regulate the flow of chilled fluid through cooling coil 26 and the flow of heated fluid through heating coil 28, depending upon whether the circulating air needs to be cooled or heated. Cooing coil 26 and heating coil 28 provide "mechanical" heating and cooling of the air and are referred to herein as "mechanical temperature control elements." The amount of cooling or heating energy that is required to be provided by mechanical temperature control elements is referred to herein as a "mechanical load" of the HVAC system.

Sensors 30 and 32, respectively, measure the temperature and humidity of the outdoor air and provide signals to controller 24. Another pair of sensors 34 and 36, respectively, measure the temperature and humidity of the air in return duct 14. Additional temperature sensors 38 and 39 are located in the outlet of supply duct 18 and in room 12.

Controller 24 executes a software program that implements an air side economizer function that uses outdoor air to reduce the mechanical cooling requirements for air-handling unit 10. There are three air side economizer control strategies that are in common use: temperature, enthalpy, and temperature and enthalpy. These strategies control transitions between two air circulation modes: minimum outdoor air with mechanical cooling and maximum outdoor air with mechanical cooling.

In temperature economizer control, an outdoor air temperature is compared to the return temperature or to a switch-over threshold temperature. If mechanical cooling is required and the outdoor air temperature is greater than the return air temperature or the switch-over threshold temperature, then a minimum amount of outdoor air required for ventilation (e.g. 20% of room supply air) enters air-handling unit 10. If mechanical cooling is required and the outdoor air temperature is less than the return temperature or a switch over threshold temperature, then a maximum amount of outdoor air (e.g. 100%) enters air-handling unit 10. In this case, outlet damper 20 and inlet damper 22 are opened fully while return damper 16 is closed.

With enthalpy economizer control, the outdoor air enthalpy is compared with the return air enthalpy. If mechanical cooling is required and the outdoor air enthalpy is greater than the return air enthalpy, then the minimum amount of outdoor air required for ventilation enters the air-handling unit. Alternatively, when mechanical cooling is required and the outdoor air enthalpy is less than the return air enthalpy, then the maximum amount of outdoor air enters airhandling unit 10.

With the combined temperature and economizer control strategy, when mechanical cooling is required and the outdoor temperature is greater than the return temperature or the outdoor enthalpy is greater than the return enthalpy, the minimum amount of outdoor air required for ventilation is used. If mechanical cooling is required and the outdoor temperature is less than the return air temperature and the outdoor enthalpy is less than the return enthalpy, then the maximum amount of outdoor air enters the air-handling unit. The parameters of either strategy that uses enthalpy have to be adjusted to take into account geographical environmental variations.

There are a number of different processes that can be used to regulate dampers 16, 20, and 22 to control flow rate of outdoor air, such as, direct airflow measurement method or energy and mass balance method.

The direct airflow measurement method requires sensors that measure airflow rate, which enables the fraction of outdoor air in the supply air to be controlled with a feedback controller. Krarti, "Experimental Analysis of Measurement and Control Techniques of Outdoor Air Intake Rates in VAV Systems," ASHRAE Transactions, Volume 106, Part 2, 2000, describes several well-know methods for directly measuring the outdoor air fraction.

Alternatively, the fraction of outdoor air in the room supply air can be determined by performing energy and mass balances. Drees, "Ventilation Airflow Measurement for ASHRAE Standard 62-1989," ASHRAE Journal, October, 1992; Hays et al., "Indoor Air Quality Solutions and Strategies," Mc-Graw Hill, Inc., pages 200-201, 1995; and Krarti (supra), describe methods for determining the fraction of outdoor air in the supply air based on a concentration balance for carbon dioxide. The fraction of outdoor air in the supply air is determined from the expression:

$$f_{oa} = \frac{C_{ra} - C_{sa}}{C_{ra} - C_{oa}}$$

where Cra is the carbon dioxide concentration of the return air, Csa is the carbon dioxide concentration of the supply air, and Coa is the carbon dioxide concentration of the outdoor air.

Performing mass balances on the water vapor and air entering and leaving the room gives:

$$f_{oa} = \frac{\omega_{ra} - \omega_{ma}}{\omega_{ra} - \omega_{oa}}$$

where ωra is the humidity ratio of the return air, ωma is the humidity ratio of the mixed air, and ωoa is the humidity ratio of the outdoor air.

Performing an energy and mass balance on the air entering and leaving the room gives:

$$f_{oa} = \frac{h_{ra} - h_{ma}}{h_{ra} - h_{oa}}$$

where hra is the enthalpy of the return air, hma is the enthalpy of the mixed air, and hoa is the enthalpy of the outdoor air.

Assuming constant specific heats for the return air, mixed air, and outdoor air yields:

$$f_{oa} = \frac{T_{ra} - T_{ma}}{T_{ra} - T_{oa}}$$

An estimate of the fraction of outdoor air in the supply air can be determined from a model of the airflow in the air-handling unit, as described by Seem et al., in "A Damper Control System for Preventing Reverse Airflow Through The Exhaust Air Damper of Variable-Air-Volume Air-Handling Units," International Journal of Heating, Ventilating, Air-Conditioning and Refrigerating Research, Volume 6, Number 2, pp. 135-148, April 2000, which reviews equations for modeling the airflow in air-handling unit 10. See also U.S. Pat. No. 5,791,408. The descriptions in both documents are incorporated herein by reference. The desired damper position can be determined based on the desired fraction of outdoor air and the airflow model, where the desired damper position can be determined.

One-dimensional optimization is applied to the fraction of outdoor air in the supply air to determine the optimal fraction which provides the minimal mechanical cooling load. Any of several well-known optimization techniques may be employed, such as the ones described by Richard P. Brent in "Algorithms for Minimization without Derivatives," Prentice-Hall Inc., Englewood Cliffs, N.J., 1973, or Forsythe, Malcolm, and Moler in "Computer Methods for Mathematical Computations," Prentice Hall, Englewood Cliffs, N.J., 1977. Alternatively, the "fminband" function contained in the Matlab software package available from The Mathworks, Inc., Natick Mass. 01760 U.S.A., may be used to find the optimal fraction of outdoor air.

These control strategies have assumed that the reference value or system optimal performance level was given. The reference value is typically determined by a sensor. The reference value or optimal operating conditions for a HVAC system is difficult to determine under various dynamic parameters. One problem with economizer control is the accuracy of the sensors. Humidity sensing elements can be inaccurate and unstable, which causes the economizer cycle to operate inefficiently. It would be advantageous to provide an alternative control system that minimized the need for sensors. Further, it would be advantageous to provide an alternative control strategy were the reference value is unknown. It would also be advantageous to provide a system that uses an extremum seeking controller to enhance system performance.

SUMMARY

One embodiment relates to a system and/or method, which regulates an amount of outdoor air that is introduced into a building and operates a mechanical temperature control device that varies temperature in the building. The system and method initiates a heating with minimum outdoor air State. The system and method monitors a heating control signal, a cooling control signal and a damper control signal. The system and method performs a state comparison of the heating control signal, the cooling control signal and the damper control signal to a predetermined range of values and transitions into a second state based on the comparison.

Another embodiment relates to a system and/or method, which regulates an amount of outdoor air that is introduced into a building and operates a mechanical temperature control device that varies temperature in the building. The system and method initiates a heating with minimum outdoor air State. The system and method monitors a heating control signal, a cooling control signal and a damper control signal. The system and method performs a state comparison of the heating control signal, the cooling control signal and the damper control signal to a predetermined range of values and transitions into a second state based on the comparison. The predetermined range of values include the heating control signal is at a heating minimum value for five minutes or the cooling control signal is at a cooling minimum value for five minutes to transition to a free cooling State; the damper control signal at a damper minimum value for five minutes to transition to the heating with minimum outdoor air State; and the damper control signal at a damper maximum value for five minutes to transition to a mechanical cooling with self-optimizing control State.

Yet another embodiment relates to a system and/or method, which regulates an amount of outdoor air that is introduced into a building and operates a mechanical temperature control device that varies temperature in the building. The system and method initiates a heating with minimum outdoor air State. The system and method monitors a heating control signal, a cooling control signal and a damper control signal. The system and method performs a state comparison of the heating control signal, the cooling control signal and the damper control signal to a predetermined range of values and transitioning into a second state based on the comparison. The predetermined range of values include the heating control signal is at a heating minimum value for a first predetermined interval or the cooling control signal is at a cooling minimum value for second predetermined interval to transition to a free cooling State; the damper control signal at a damper minimum value for a third predetermined interval to transition to the heating with minimum outdoor air State; and the damper control signal at a damper maximum value for a fourth predetermined interval to transition to a mechanical cooling with self-optimizing control State.

Yet another embodiment relates to a space conditioning device including an air-handling unit. The air-handling unit is coupled to a means for cooling an air and a means for heating an air. The space conditioning device includes a means for controlling the space conditioning device and at least one means for controlling a flow of the air coupled to the means for controlling the space conditioning device and the air-handling unit. The means for controlling the space conditioning device, in a start up stage, initiates a heating with minimum outdoor air state and the means for controlling the space conditioning device is configured to control the at least one means for controlling the flow of the air utilizing extremum logic.

BRIEF DESCRIPTION OF THE FIGURES

FIG. 5 is a diagram of an extremum seeking control system, according to an exemplary embodiment.

FIG. 6 is another diagram of an extremum seeking control system, according to an exemplary embodiment.

DETAILED DESCRIPTION OF THE EXEMPLARY EMBODIMENTS

Before beginning the detailed description of exemplary embodiments, several general comments are warranted about the applicability and the scope of the present invention.

Although the description below contains many specificities, these specificities are utilized to illustrate some of the preferred embodiments of this invention and should not be construed as limiting the scope of the invention. The scope of this invention should be determined by the claims, their legal equivalents and the fact that it fully encompasses other embodiments, which may become apparent to those skilled in the art. A method or device does not have to address each and every problem to be encompassed by the present invention. All structural, chemical, and functional equivalents to the elements of the below-described invention that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component, or method step in the present disclosure is intended to be dedicated to the public, regardless of whether the element, component, or method step is explicitly recited in the claims.

Figure 1:
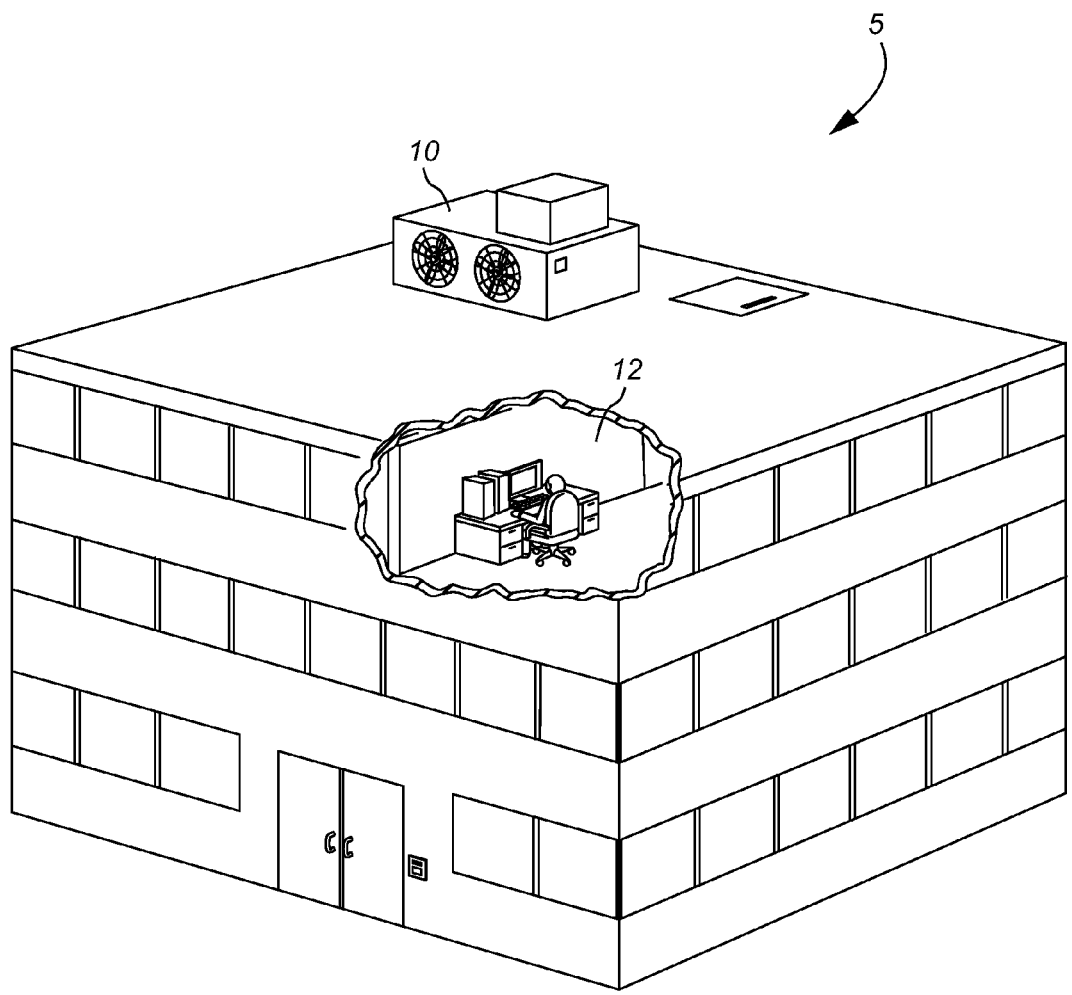
FIG. 1 is an isometric view of a building according to an exemplary embodiment with an HVAC system including an air handling unit.

FIG. 1 shows a building 5 with an air-handling unit 10 according to an exemplary embodiment. Air handling unit 10 is part of a heating, ventilation and air conditioning (HVAC) system which controls the environment of a room 12 in a building 5.

Figure 2:
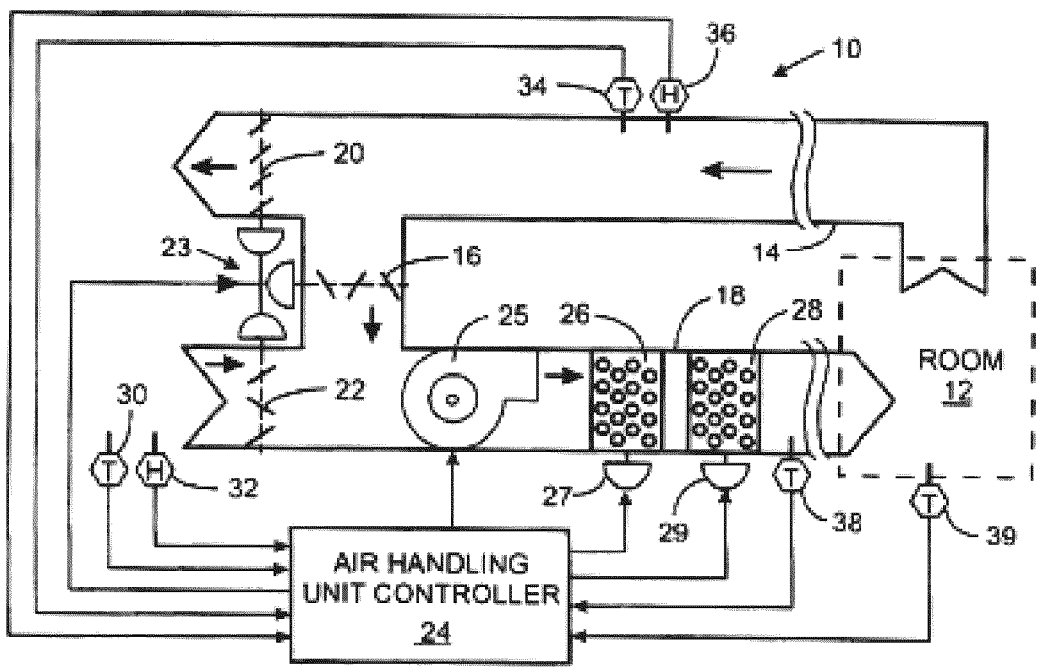
FIG. 2 is a diagram of an air-handling unit in a HVAC system.
Figure 3:
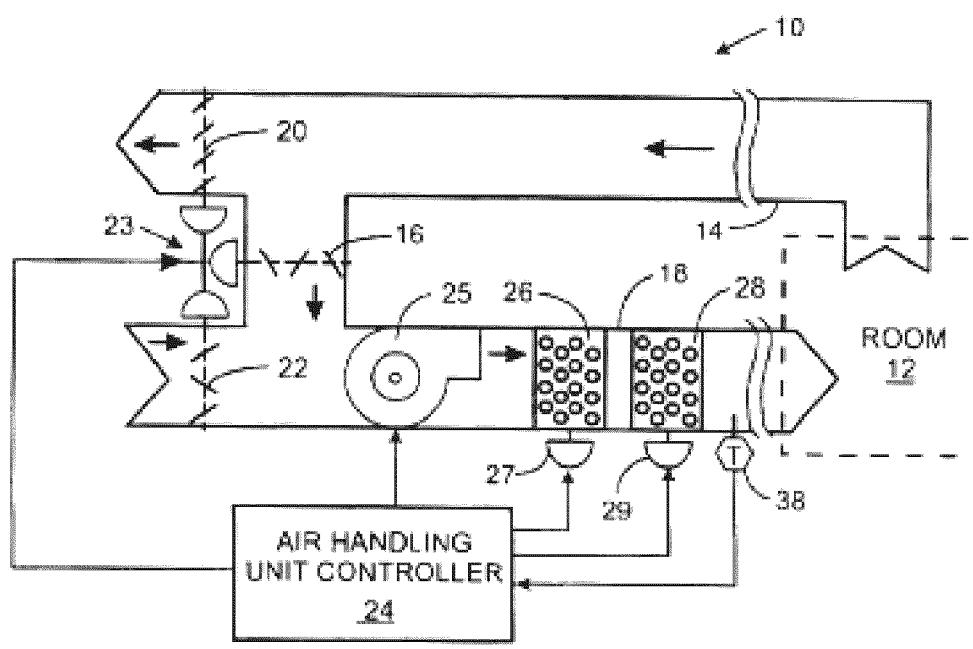
FIG. 3 is a diagram of an air-handling unit in a HVAC system without the outdoor air temperature and return air temperature and relative humidity sensors, according to an exemplary embodiment.

FIG. 2 shows air-handling unit controller 24, which utilizes software to control the air flow rate. FIG. 3 shows air-handling unit controller 24 with only a supply air temperature sensor 38. The underlying software configures controller 24 as a finite state machine that has three states depicted in FIG. 4. A transition occurs from one state to another, as indicated by the arrows, when a specified condition or set of conditions occurs. In an exemplary embodiment, the operational data of air-handling unit 10 is checked when controller 24 is in a given state to determine whether a defined transition condition exists. A number of the transition conditions are specified in terms of the control being "saturated" in the present state. The term saturated may be a specific time interval, temperature condition, supply air condition and/or return air condition.

In an exemplary embodiment, saturation occurs when controller remains in a given operating mode for a predetermined period of time without being able to adequately control the environment of the building. For example, saturation occurs in a mechanical cooling mode when the system is unable to cool room 12 to the desired temperature within a reasonable amount of time.

In State 1, valve 29 for heating coil 28 is controlled to modulate the flow of hot water, steam, or electricity to heating coil 28, thereby controlling the amount of energy transferred to the air. This maintains room 12 or supply air temperature at the setpoint. Dampers 16, 20, and 22 are positioned for a minimum flow rate of outdoor air and there is no mechanical cooling, (i.e. chilled water valve 27 is closed). The minimum flow rate of outdoor air is the least amount required for satisfactory ventilation in room 12. For example, 20% of the air supplied to room 12 is outdoor air. The condition for a transition to State 2 is defined by the heating control signal being saturated in the "No Heat Mode." Such saturation occurs when valve 29 of heating coil 28 remains closed for a defined period of time (i.e. heating of the supply air is not required during that period). This transition condition can result from the outdoor temperature rising to a point at which the interior of room 12 does not need mechanical heating.

In State 2, dampers 16, 20, and 22 alone are used to control the supply air temperature in supply duct 18 (i.e. no mechanical heating or cooling). In this State the amount of outdoor air that is mixed with the return air from room 12 is regulated to heat or cool the air being supplied to room 12. Because there is no heating or mechanical cooling, the inability to achieve the setpoint temperature results in a transition to either State 1 or 3. A transition occurs to State 1 for mechanical heating when either for a defined period of time the flow of outdoor air is less than that required for proper ventilation or outdoor air inlet damper 22 remains in the minimum open position for a given period of time. The finite state machine makes a transition from State 2 to State 3 for mechanical cooling upon the damper control being saturated in the maximum outdoor air position (e.g. 100% of the air supplied to the room is outdoor air).

In State 3, chilled water valve 27 for cooling coil 26 is controlled to modulate the flow of chilled water and control the amount of energy removed from the air. At this time, extremum seeking control is used to modulate dampers 16, 20, and 22 to introduce an optimal amount of outdoor air into AHU 10. In an exemplary embodiment, a transition occurs to State 2 when the mechanical cooling does not occur for the given period of time (i.e. the cooling control is saturated in the no-cooling mode).

Figure 4:
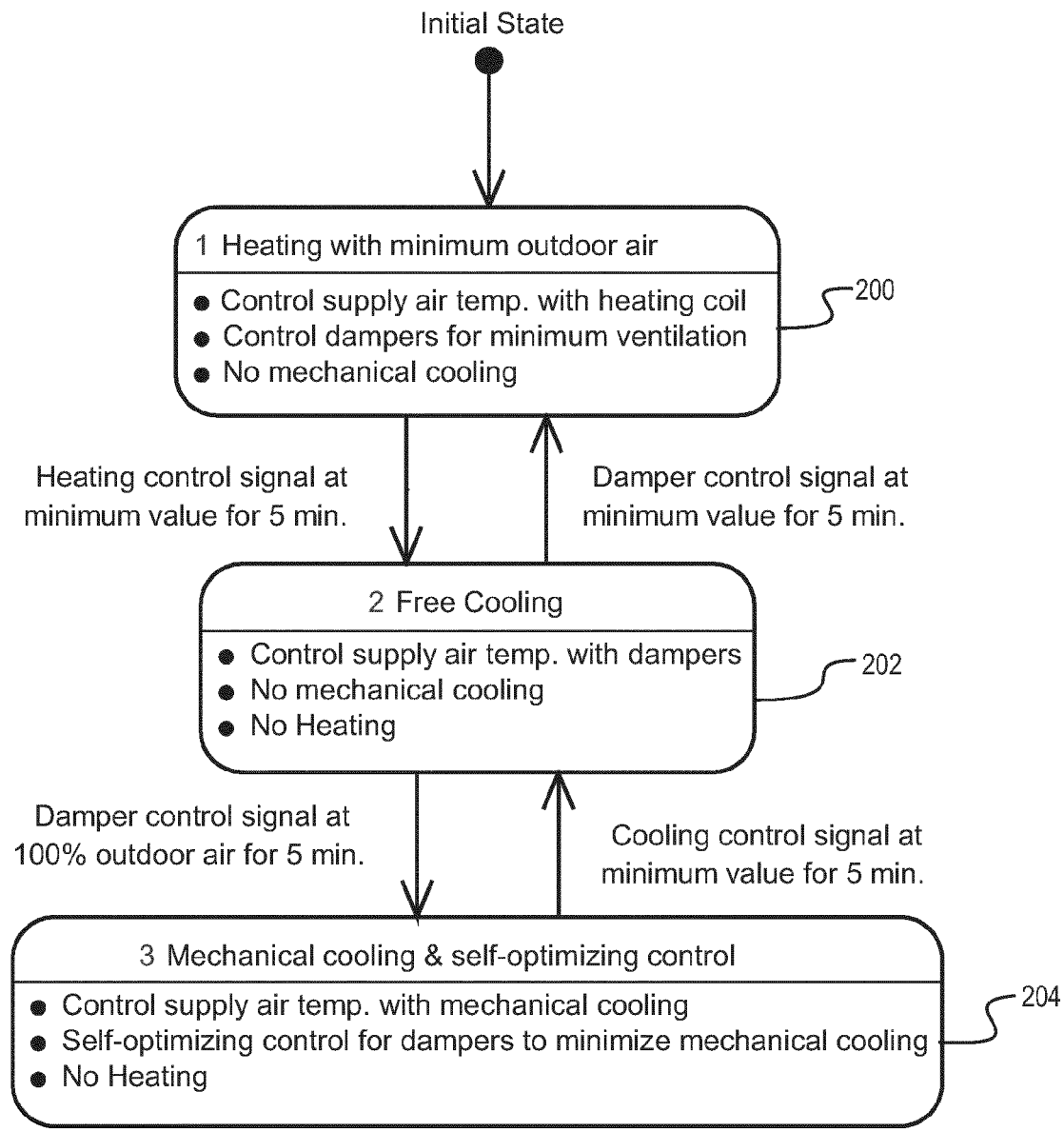
FIG. 4 is a state diagram of a finite state machine with three operating states that are implemented in the controller of the air-handling unit in FIG. 2, according to an exemplary embodiment.

Referring further to FIG. 4, a state diagram for controlling an air side economizer with only supply air temperature sensor 38 is shown. Air-handling unit 10 has no sensors for controlling the air-side economizer. In State 1, heating with minimum outdoor air required for ventilation is initiated. In cold climates, the initial state of control is a heating with minimum outdoor air State 200. In this exemplary embodiment State 1 and heating with minimum outdoor air State 200 are interchangeable terms. The system starts up in heating with minimum outdoor air State 200 to minimize the potential that cooling coil 26 and heating coil 28 could freeze. State 1 controls the supply air temperature by modulating the amount of heat supplied from heating coils 28. Dampers 16, 20, and 22 are controlled for minimum ventilation. In an exemplary embodiment, a transition to State 2 occurs after the heating control signal has been at its minimum value (no-heat position) for five minutes.

In State 2, the system is utilizing outdoor air to provide free cooling to the system. In this exemplary embodiment State 2 and a free cooling State 202 are interchangeable terms. State 2 controls the supply air temperature by modulating dampers 16, 20, and 22 to adjust the mixing of outdoor air with return air. In an exemplary embodiment, a transition to State 1 occurs after dampers 16, 20, and 22 have been at a minimum ventilation requirement for five minutes. In an exemplary embodiment, a transition to State 3 occurs after dampers 16, 20, and 22 have been controlled to supply 100% outdoor air for five minutes.

In State 3, the system utilizes mechanical cooling with self-optimizing control to control dampers 16, 20, and 22. In this exemplary embodiment, State 3 and a mechanical cooling with self-optimizing control State 204 are interchangeable terms. State 3 controls mechanical cooling with self-optimizing control for the outdoor air dampers. State 3 controls the supply air temperature by modulating the flow rate of chilled water or refrigerant through cooling coil 26. Self-optimizing control is used to determine damper 16, 20, and 22 positions that minimize the amount of mechanical cooling. Ventilation requirements are set at a lower limit for the amount of outside air in supply duct 18. In an exemplary embodiment, a transition to State 2 occurs after the control signal for cooling has been in the no-cooling command mode for five minutes.

Figure 7:
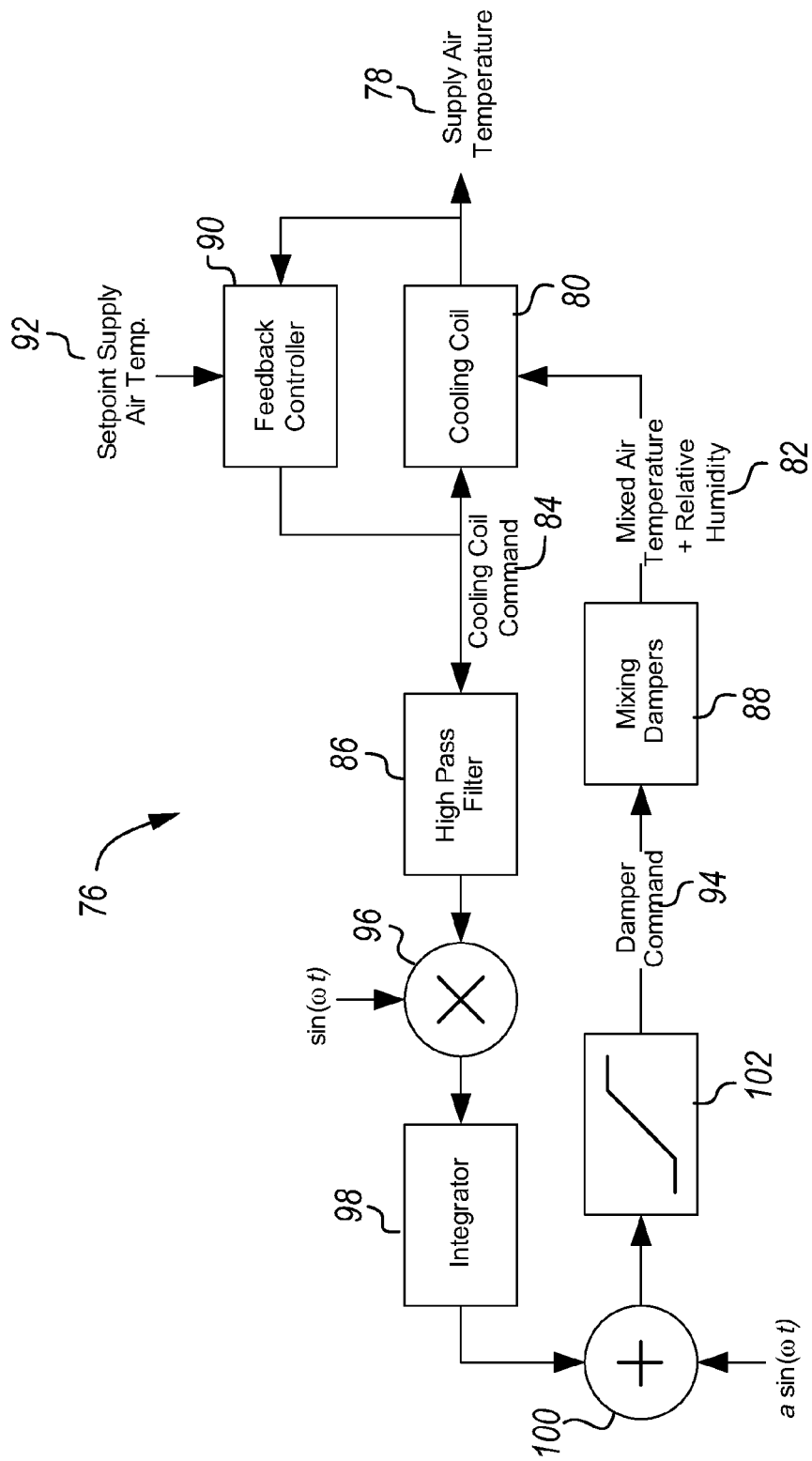
FIG. 7 is a diagram of a HVAC system in which extremum seeking controller has been incorporated, according to an exemplary embodiment.

In FIGS. 5-7, an extremum control system 62 is shown. Extremum control is the tracking of a varying maximum and minimum parameter. The relationship between inputs and outputs in a static response curve is nonlinear in extremum control system 62. The extremum controller finds the optimum operating point and tracks it under varying conditions (e.g., changes in temperature, humidity ratio, etc.).

In FIG. 5, a basic extremum control system 62 is shown. The process can work in either an open loop or closed loop control system. A search algorithm 54 continually modifies the output of the process to approach the extremum despite a change in the process 56 or an influence of disturbances 58. The process communicates search algorithm 54 to plant 74. Search algorithm 54 determines a setpoint for the system. In addition to search algorithm 54 communicating the setpoint to a plant 74, plant 74 also receives change in the process 56 signal from the process. Plant 74 is configured to use either signal to modify the process. In an exemplary embodiment, plant 74 may use change in the process 56 signal from the process to provide a command 60 to the process to move the system towards the extremum. In another exemplary embodiment, plant 74 may use search algorithm 54 signal from to provide command 60 to the process to move the system towards the extremum.

In FIG. 6, a basic extremum seeking static map is shown. Where y is the output to be minimized; f* is the minimum of the map; f' is the second derivative (positive—f(θ) has a min.); θ* is the unknown parameter; θ' is the estimate of θ*; k is the adaptation gain (positive) of the integrator 1/s; a is the amplitude of the probing signal; ŵ is the frequency of the probing signal; h is the cut-off frequency of the washout filter; + is "modulation" by summation and X is "demodulation" by multiplication. Where a washout filter is given by:

$$h = \frac{s}{s+h}$$

Extremum control system 62 starts with an estimate of the unknown parameter θ*. The control system uses this parameter to determine the optimum operating point and to track the optimum operating point as it varies. The output to be minimized y is transmitted to washout filter 64. Washout filter 64 screens y and transmits the screened y to a multiplier 66. Multiplier 66 transmits ξ to an adaptation gain filter 68. Adaptation gain filter 68 transmits an estimate of θ* to an summation 70, which transmits a control signal to plant 74. In an exemplary embodiment, the algorithm for the extremum seeking system is a single parameter system. It is noted that the algorithm may have several or a plurality of parameters.

In FIG. 7, an extremum seeking control system 76 for a HVAC system is shown. Extremum seeking control system 76 includes a heat exchanger 80, a feedback controller 90, a high pass filter 86, a mixer 96, an integrator 98, an amplifier 100, a damper command control 102 and a mixing damper 88. Heat exchanger 80 lowers the temperature of the air. Feedback controller 90 maintains a supply air temperature 78 at a setpoint 92 by adjusting the position for chilled water valve of cooling coil 26 (FIG. 2). Damper command control 102 maintains the dampers between 0% and 100% outside air.

Figure 8:
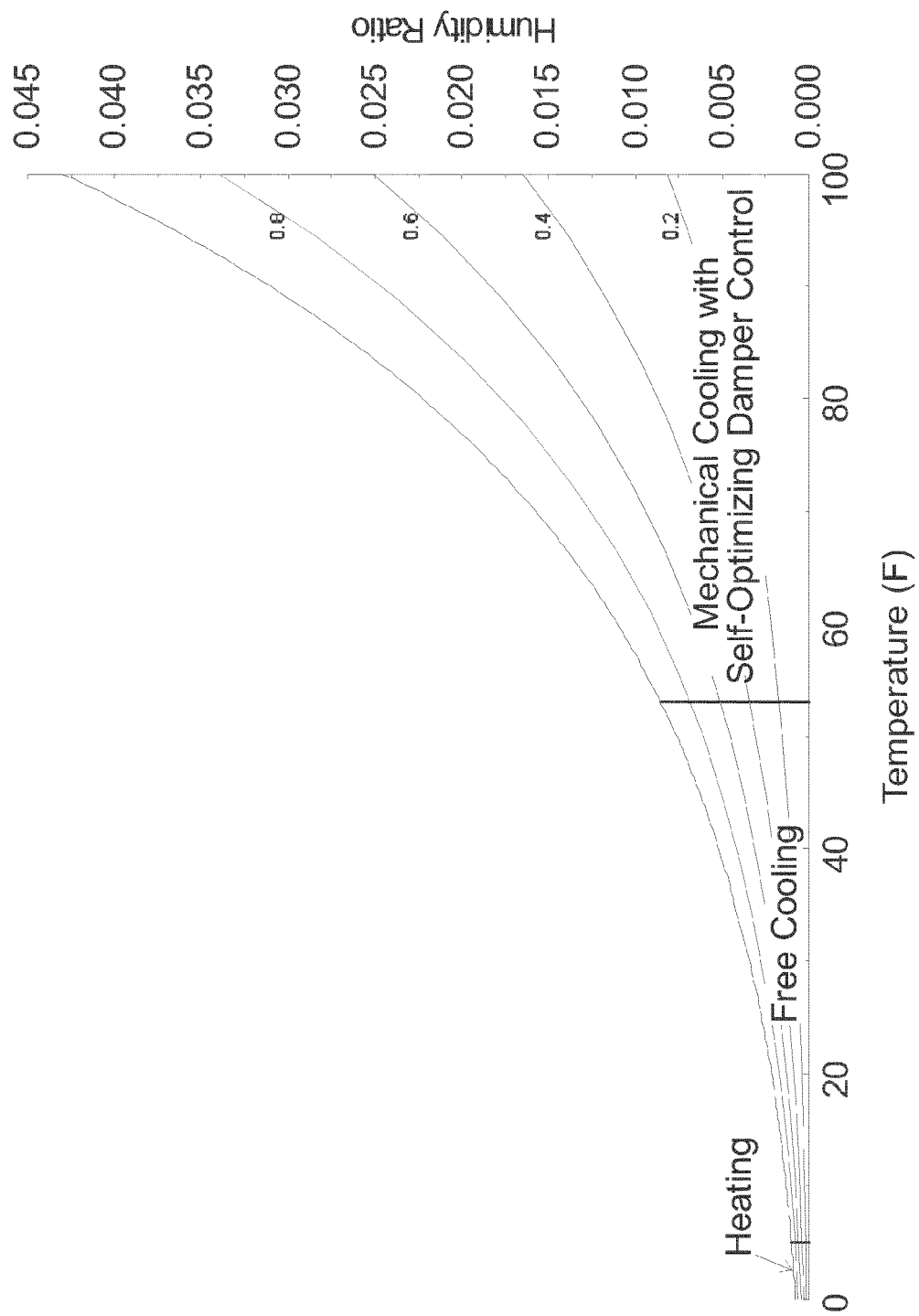
FIG. 8 is an exemplary psychometric chart that shows outdoor air conditions for the three regions of control, according to an exemplary embodiment.

FIG. 8 is an exemplary psychometric chart that shows outdoor air conditions for the three regions of control. In heating with minimum outdoor air State 200, the system heats the environment by controlling the supply air temperature with heating coil 28. Dampers 16, 20, and 22 are controlled to provide minimum ventilation and there is no mechanical cooling. In free cooling State 202, the supply air temperature is controlled by dampers 16, 20, and 22. There is no mechanical cooling and no mechanical heating. In mechanical cooling and self-optimizing State 204, the supply air temperature is controlled with mechanical cooling. Dampers 16, 20, and 22 are controlled by the self-optimizing system to minimize mechanical cooling and there is no mechanical heating.

Figure 9:
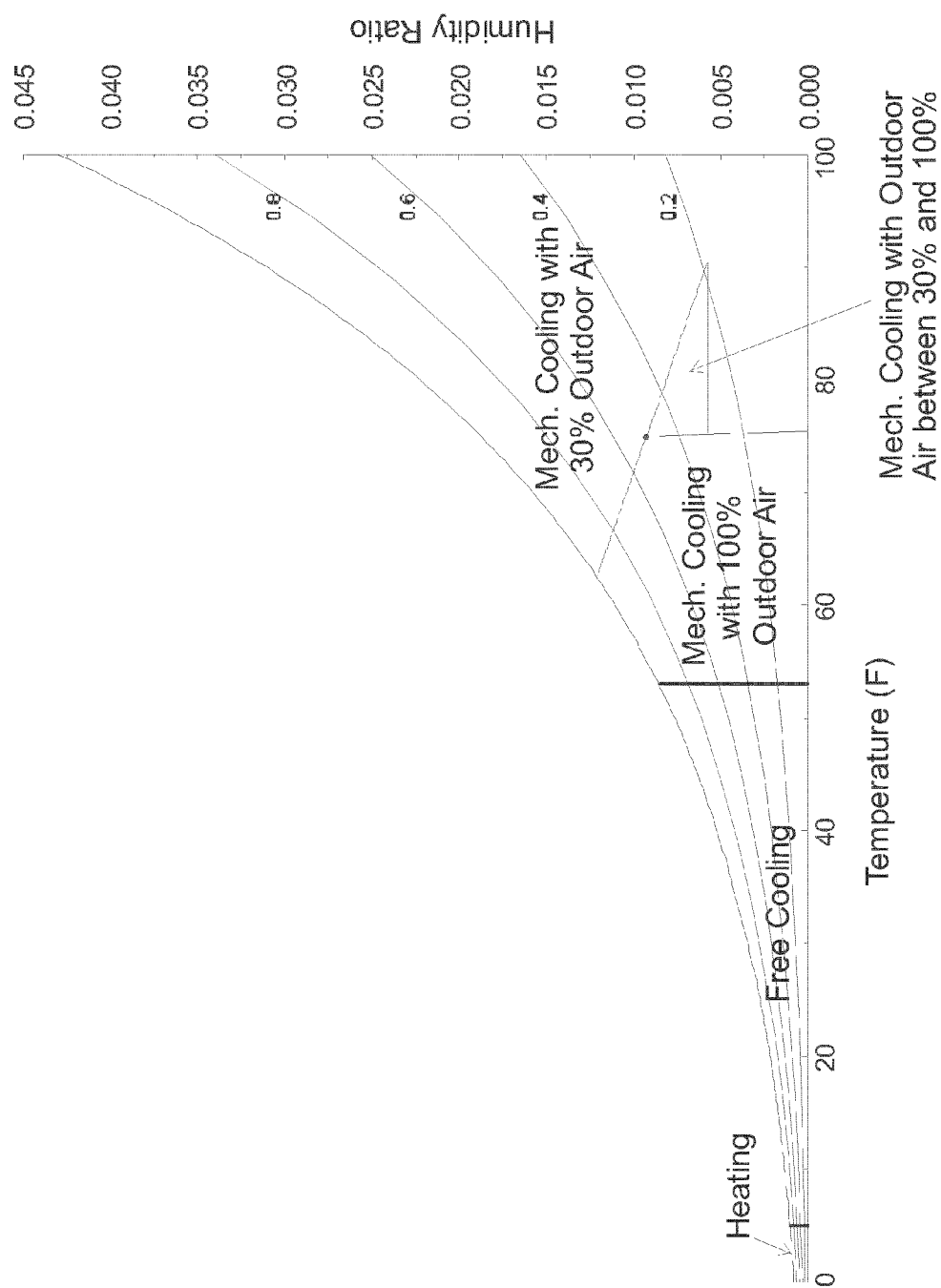
FIG. 9 is an exemplary psychometric chart that shows the outdoor air conditions for different control states and regions of self-optimizing damper control with an ideal coil, according to an exemplary embodiment.
Figure 10:
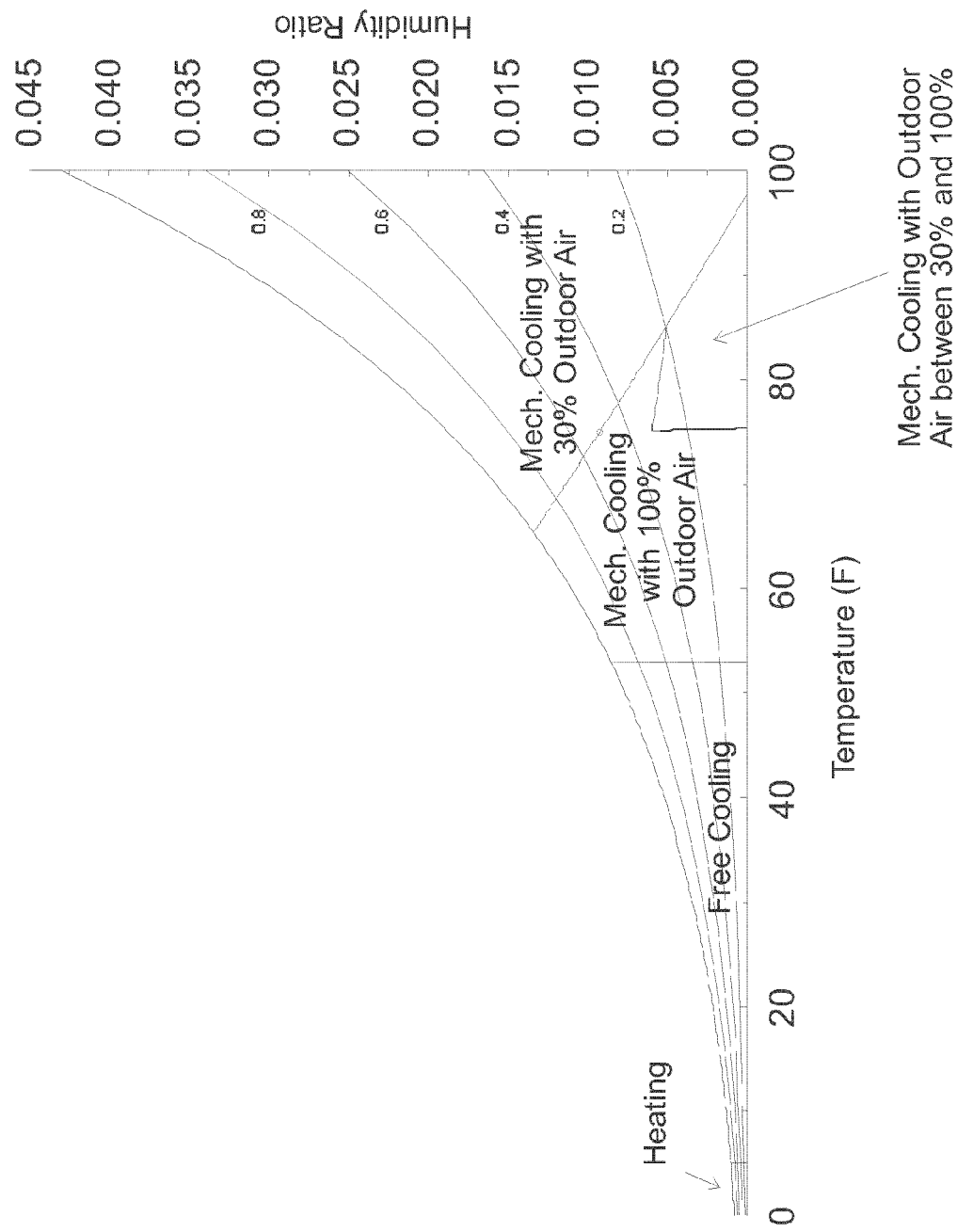
FIG. 10 is an exemplary psychometric chart that shows the regions of optimal control and lines for transitioning between states for a cooling coil model with a bypass factor of 0.3, according to an exemplary embodiment.

Referring to FIGS. 9 and 10, simulations were performed for an ideal coil and air-handling unit 10 that had a minimum fraction of outdoor air to supply air of 30%. FIG. 9 shows the outdoor air conditions where the self-optimizing control will transition between the following three fractions of outdoor air: 30% outdoor air, between 30 and 100% outdoor air, and 100% outdoor air. FIG. 10 is a similar figure for a non-ideal coil with a bypass factor of 0.3. Cooing coil's 26 and heating coil's 28 characteristics may change during the day as the water temperature varies. Also, cooling coil's 26 and heating coil's 28 characteristics may change with time as cooling coil 26 and heating coil 28 become foiled from dirt accumulating on these coils 26, 28.

Figure 11:
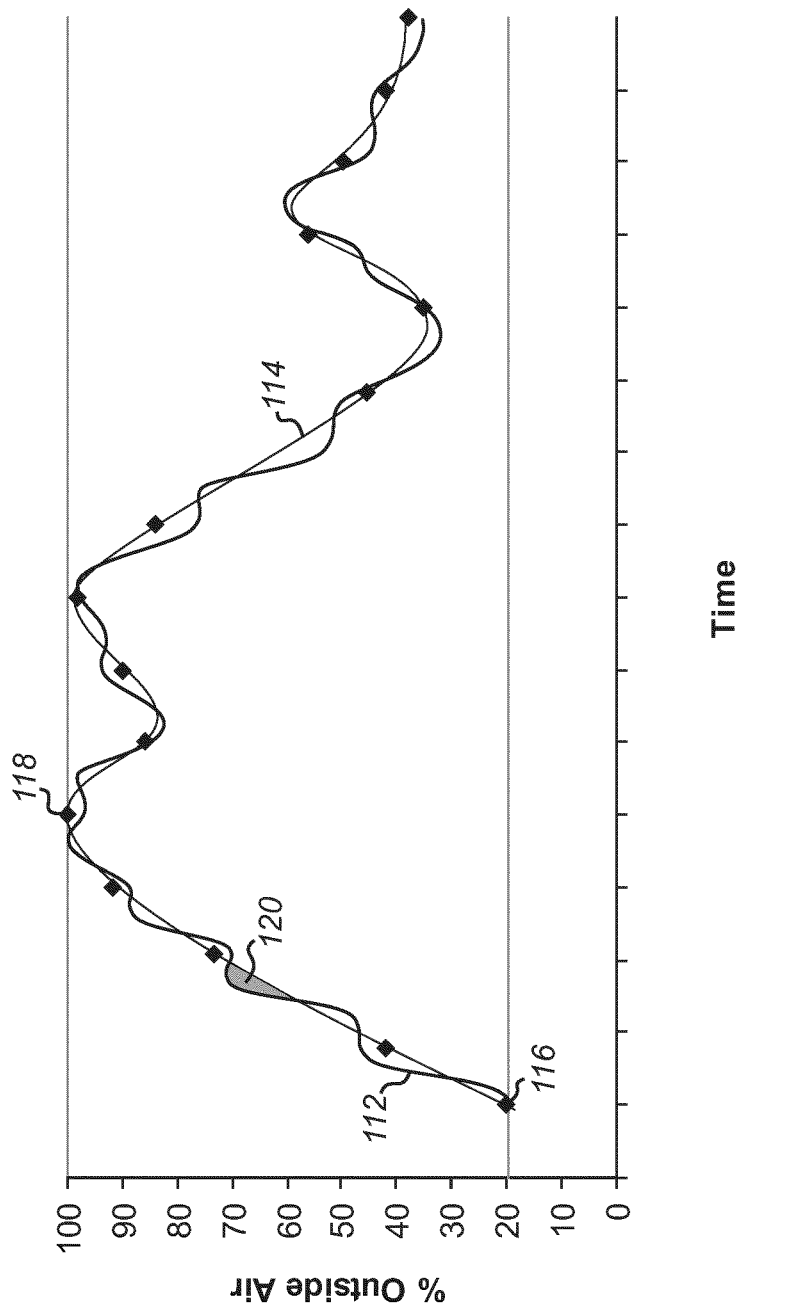
FIG. 11 shows the extremum-controlled HVAC system tracking the optimal solution, according to an exemplary embodiment.

FIG. 11 shows extremum controlled system 62 varying the percentage of outside from twenty percent 116 to one hundred percent 118. The optimal percentage of outside air curve 114 is tracked by the extremum controlled outside air curve 112. The extremum controlled system tracks the optimal solution, which causes some inefficiency 120 in the system.

In an exemplary embodiment, the cooling coil control signal is a function of the load on cooling coil 26. The signal from cooling coil 26 is communicated to the control circuit. The control circuit utilizing extremum seeking logic modulates dampers 16, 20, and 22.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with figures should not be construed as imposing on the invention any limitations that may be present in the figures. The present invention contemplates methods, systems and program products on any machine-readable media for accomplishing its operations. The embodiments of the present invention may be implemented using an existing computer processors, or by a special purpose computer processor for an appropriate HVAC system, incorporated for this or another purpose or by a hardwired system.

It is important to note that the construction and arrangement of the sensor-free control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., air-handling unit), the position of elements may be reversed or otherwise varied (e.g., air-handling unit), and the nature or number of discrete elements or positions may be altered or varied (e.g., air-handling unit). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

What is claimed is:

1. A cooling system comprising:
   a mechanical cooling system comprising a mechanical cooling element and a mechanical cooling system controller, the mechanical cooling system controller outputting a control signal for adjusting the amount of cooling provided by the mechanical cooling element;
   an economizer that provides mixed air past the mechanical cooling element to cool the mixed air prior to supplying the air to a building space via a supply air duct;
   wherein the economizer includes a damper that controls the amount of outdoor air being mixed with return air in the economizer; and
   an extremum seeking controller that uses the control signal output from the mechanical cooling system controller as an input, uses the input to search for an economizer damper position that minimizes the amount of cooling provided by the mechanical cooling element, and outputs a damper signal for adjusting the damper to the damper position, wherein the extremum seeking controller operates by regularly perturbing the damper position away from a previously determined optimum and sets a new damper position in response to observing the effects of the perturbations, and wherein neither a temperature setpoint nor a temperature sensor feedback are used to cause the regular perturbations.

2. The cooling system of claim 1, wherein the mechanical cooling system is a chilled fluid cooling system, the mechanical cooling element is a chilled fluid cooling coil, and the mechanical cooling system controller is a feedback controller; and wherein the control signal output from the feedback controller is configured to cause a valve associated with the chilled fluid cooling coil to adjust the amount of cooling provided by the chilled fluid cooling element.

3. The cooling system of claim 2, wherein the feedback controller uses feedback from a supply air temperature sensor to maintain a supply air temperature at a setpoint by changing the control signal, thereby adjusting the amount of cooling provided by the chilled fluid cooling coil.

4. The cooling system of claim 3, wherein the extremum seeking controller does not use a sensor input to search for damper positions.

5. The cooling system of claim 3, wherein neither the extremum seeking controller nor the feedback controller use a relative humidity sensor to conduct control activities for the cooling system and the economizer.

6. The cooling system of claim 3, wherein neither the extremum seeking controller nor the feedback controller use an outdoor air temperature sensor to conduct control activities for the cooling system and the economizer.

7. The cooling system of claim 3, wherein neither the extremum seeking controller nor the feedback controller use a return air temperature sensor to conduct control activities for the cooling system and the economizer.

8. The cooling system of claim 3, further comprising:
a state machine that transitions the cooling system between a first cooling state that uses the extremum seeking controller with the mechanical cooling system to a second cooling state that uses free cooling and does not use the mechanical cooling system.

9. The cooling system of claim 8, wherein the state machine is configured to transition from the first cooling state to the second cooling state when the control signal output from the mechanical cooling system controller is at or below a minimum value for a predetermined period of time.

10. The cooling system of claim 9, wherein the state machine is configured to transition from the second cooling state to the first cooling state when a damper control signal exceeds a maximum value for a predetermined period of time.

* * * * *